United States Patent
Zhou et al.

(10) Patent No.: US 12,471,029 B2
(45) Date of Patent: *Nov. 11, 2025

(54) POWER CONTROL INFORMATION FOR COMMON TCI STATES

(71) Applicant: QUALCOMM Incorporated, San Diego, CA (US)

(72) Inventors: Yan Zhou, San Diego, CA (US); Tianyang Bai, Mountain View, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,377

(22) Filed: Apr. 4, 2024

(65) Prior Publication Data

US 2024/0251358 A1 Jul. 25, 2024

Related U.S. Application Data

(63) Continuation of application No. 17/544,573, filed on Dec. 7, 2021.
(Continued)

(51) Int. Cl.
*H04W 52/14* (2009.01)
*H04W 52/24* (2009.01)
*H04W 52/32* (2009.01)

(52) U.S. Cl.
CPC ....... *H04W 52/146* (2013.01); *H04W 52/242* (2013.01); *H04W 52/325* (2013.01)

(58) Field of Classification Search
CPC ............. H04W 52/146; H04W 52/242; H04W 52/325; H04W 52/42
(Continued)

(56) References Cited

U.S. PATENT DOCUMENTS

2018/0014257 A1 1/2018 Ouchi et al.
2020/0145062 A1 5/2020 Jung et al.
(Continued)

FOREIGN PATENT DOCUMENTS

CN 111093257 A 5/2020
CN 111656842 A 9/2020
CN 111901020 A 11/2020

OTHER PUBLICATIONS

Interdigital, et al., "Discussions on Multi-Beam Enhancement", 3GPP Draft, 3GPP TSG RAN WG1 #103-e, R1-2007626, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Oct. 23, 2020 (Oct. 23, 2020), XP051945280, 12 Pages, Paragraphs [0001]-[0005].
(Continued)

*Primary Examiner* — Michael Y Mapa
(74) *Attorney, Agent, or Firm* — Dinsmore & Shohl LLP

(57) ABSTRACT

Certain aspects of the present disclosure provide techniques for providing power control parameters for channels and/or reference signals sharing a same common transmission configuration indicator (TCI) state. A method that may be performed by a user equipment (UE) includes measuring a path loss at a user equipment, receiving, from a network, a plurality of power control configurations, wherein: each power control configuration of the plurality of power control configurations comprises a respective plurality of power control parameters, and each power control configuration of the plurality of power control configurations applies to a respective uplink channel or reference signal object associated with a common transmission configuration indication (TCI) state, and transmitting at least one uplink channel or reference signal object at a transmission power that is based
(Continued)

on the measured path loss and at least one of the power control configurations of the plurality of power control configurations.

12 Claims, 8 Drawing Sheets

Related U.S. Application Data

(60) Provisional application No. 63/133,738, filed on Jan. 4, 2021.

(58) Field of Classification Search
USPC .............. 370/318; 455/127.1, 504–506, 522
See application file for complete search history.

(56) References Cited

U.S. PATENT DOCUMENTS

| | | | |
|---|---|---|---|
| 2020/0314857 A1 | 10/2020 | Pezeshki et al. | |
| 2020/0383060 A1 | 12/2020 | Park et al. | |
| 2020/0389852 A1 | 12/2020 | Wang et al. | |
| 2022/0216929 A1* | 7/2022 | Matsumura | H04L 5/0023 |
| 2022/0217643 A1 | 7/2022 | Zhou et al. | |
| 2022/0295417 A1* | 9/2022 | Sun | H04W 52/146 |
| 2022/0312224 A1* | 9/2022 | Zhang | H04W 52/242 |
| 2023/0292250 A1* | 9/2023 | Määttänen | H04W 52/242 |
| 2023/0309178 A1 | 9/2023 | Matsumura et al. | |
| 2023/0379902 A1* | 11/2023 | Matsumura | H04W 16/28 |
| 2024/0259950 A1* | 8/2024 | Nilsson | H04W 52/42 |

OTHER PUBLICATIONS

International Preliminary Report on Patentability—PCT/US2021/062476 The International Bureau of WIPO—Geneva, Switzerland, Jul. 13, 2023.
International Search Report and Written Opinion—PCT/US2021/062476—ISA/EPO—Mar. 15, 2022.
Moderator (Samsung): "Moderator Summary#5 for Multi-Beam Enhancement", 3GPP Draft, 3GPP TSG RAN WG1 #103-e, R1-2009749, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 13, 2020 (Nov. 13, 2020), XP051954406, 12 Pages, pp. 2-7.
Moderator (Samsung), "Moderator Summary for Multi-beam Enhancement", 3GPP TSG RAN WG1 #103-e, R1-2008147, e-Meeting, Nov. 2, 2020, 30 Pages.

* cited by examiner

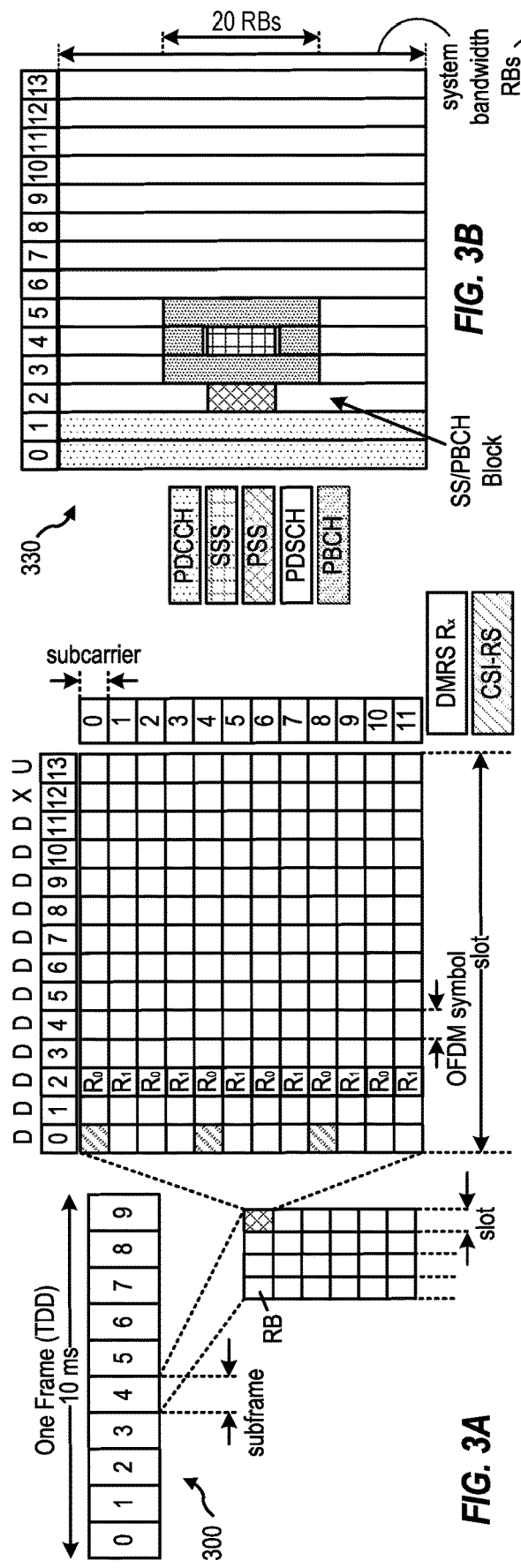
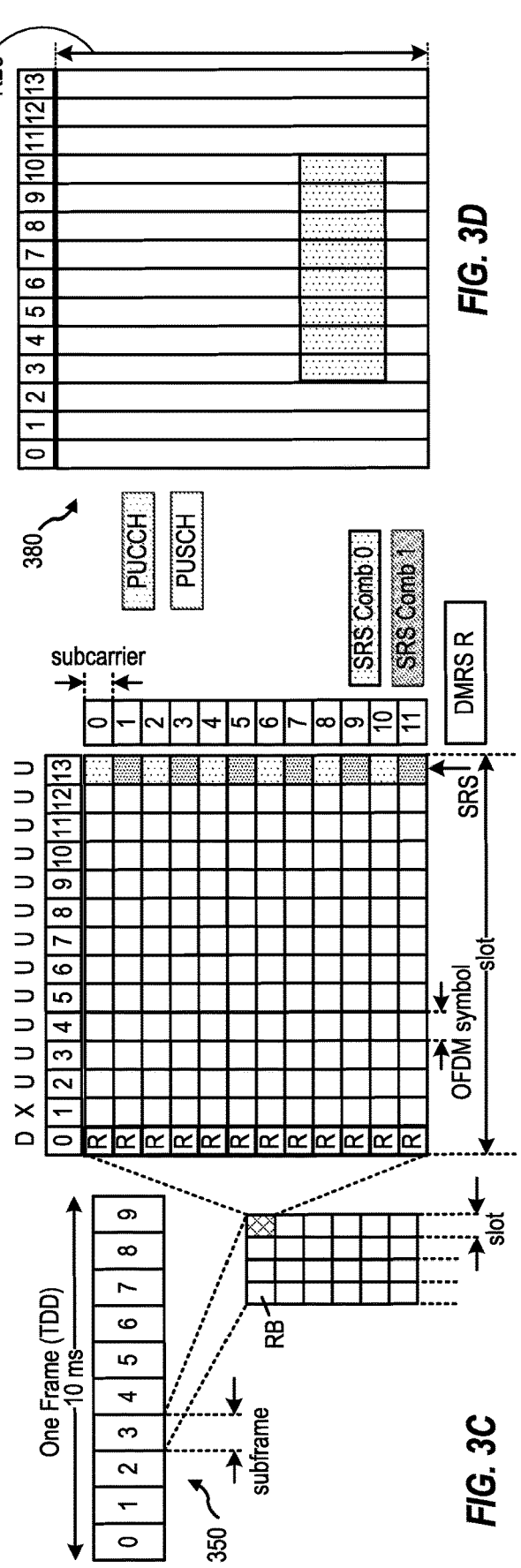
FIG. 3A  FIG. 3B  FIG. 3C  FIG. 3D

400B

A METHOD BY A BASE STATION FOR PROVIDING POWER CONTROL PARAMETERS FOR CHANNELS AND/OR REFERENCE SIGNALS SHARING A SAME COMMON TCI STATE

402B

TRANSMITTING, TO A USER EQUIPMENT (UE), A PLURALITY OF POWER CONTROL CONFIGURATIONS

404B

RECEIVING AT LEAST ONE UPLINK CHANNEL OR REFERENCE SIGNAL OBJECT WITH A TRANSMISSION POWER THAT IS BASED ON AT LEAST ONE OF THE POWER CONTROL CONFIGURATIONS OF THE PLURALITY OF POWER CONTROL CONFIGURATIONS

*FIG. 4B*

POWER CONTROL INFORMATION FOR COMMON TCI STATES

CROSS-REFERENCE TO RELATED APPLICATIONS

This application is a continuation of U.S. patent application Ser. No. 17/544,573, filed Dec. 7, 2021, which claims benefit of and priority to U.S. Provisional Application No. 63/133,738, filed Jan. 4, 2021, which are hereby assigned to the assignee hereof and hereby expressly incorporated by reference herein in their entireties as if fully set forth below and for all applicable purposes.

INTRODUCTION

Field of the Disclosure

Aspects of the present disclosure relate to wireless communications, and more particularly, to techniques for configuring power control parameters for uplink channels and/or reference signals sharing a same common transmission configuration indicator (TCI) state.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These and other multiple access technologies have been adopted in various telecommunication standards to provide a common protocol that enables different wireless devices to communicate on a municipal, national, regional, and even global level. However, as the demand for mobile broadband access continues to increase, there exists a need for further improvements in these and emerging wireless communications technologies.

SUMMARY

Certain aspects can be implemented in a method for wireless communication by a user equipment (UE). The method generally includes measuring a path loss at a user equipment, receiving, from a network, a plurality of power control configurations, wherein: each power control configuration of the plurality of power control configurations comprises a respective plurality of power control parameters, and each power control configuration of the plurality of power control configurations applies to a respective uplink channel or reference signal object associated with a common transmission configuration indication (TCI) state, and transmitting at least one uplink channel or reference signal object at a transmission power that is based on the measured path loss and at least one of the power control configurations of the plurality of power control configurations.

Certain aspects can be implemented in a method for wireless communication by a base station (BS). The method generally includes transmitting, to a user equipment (UE), a plurality of power control configurations, wherein: each power control configuration of the plurality of power control configurations comprises a respective plurality of power control parameters, and each power control configuration of the plurality of power control configurations applies to a respective uplink channel or reference signal object associated with a common transmission configuration indication (TCI) state, and receiving at least one uplink channel or reference signal object with a transmission power that is based on at least one of the power control configurations of the plurality of power control configurations.

Other aspects provide processing systems configured to perform the aforementioned methods as well as those described herein; non-transitory, computer-readable media comprising instructions that, when executed by one or more processors, cause the one or more processors to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the appended drawings set forth in detail certain illustrative features of the one or more aspects. These features are indicative, however, of but a few of the various ways in which the principles of various aspects may be employed.

BRIEF DESCRIPTION OF THE FIGURES

The appended figures depict certain features of the various aspects described herein and are not to be considered limiting of the scope of this disclosure.

FIGS. 3A, 3B, 3C, and 3D depict various example aspects of data structures for a wireless communication network.

FIG. 4B is a flow diagram illustrating example operations for wireless communication by a base station (BS), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide systems and methods for configuring power control parameters for uplink channels and/or reference signals sharing a common transmission configuration indicator (TCI) state. When communicating on the uplink (UL), a UE may determine a transmission power for uplink transmissions based on one or more power control (PC) parameters. In some cases, due to different target UL performance metrics (e.g., UL reference signal received power (RSRP), signal to noise ratio (SNR), signal to interference plus noise ratio (SINR), and the like), the power control parameters for different UL channels and/or reference signals sharing a same TCI state may be different. Therefore, aspects of the present disclosure provide techniques for configuring power control parameters for uplink channels and/or reference signals sharing a common TCI state. In some cases, such techniques may be used to ensure that the individual UL performance metrics for these different UL channels and/or reference signals are satisfied.

Introduction to Wireless Communication Networks

Figure 1:
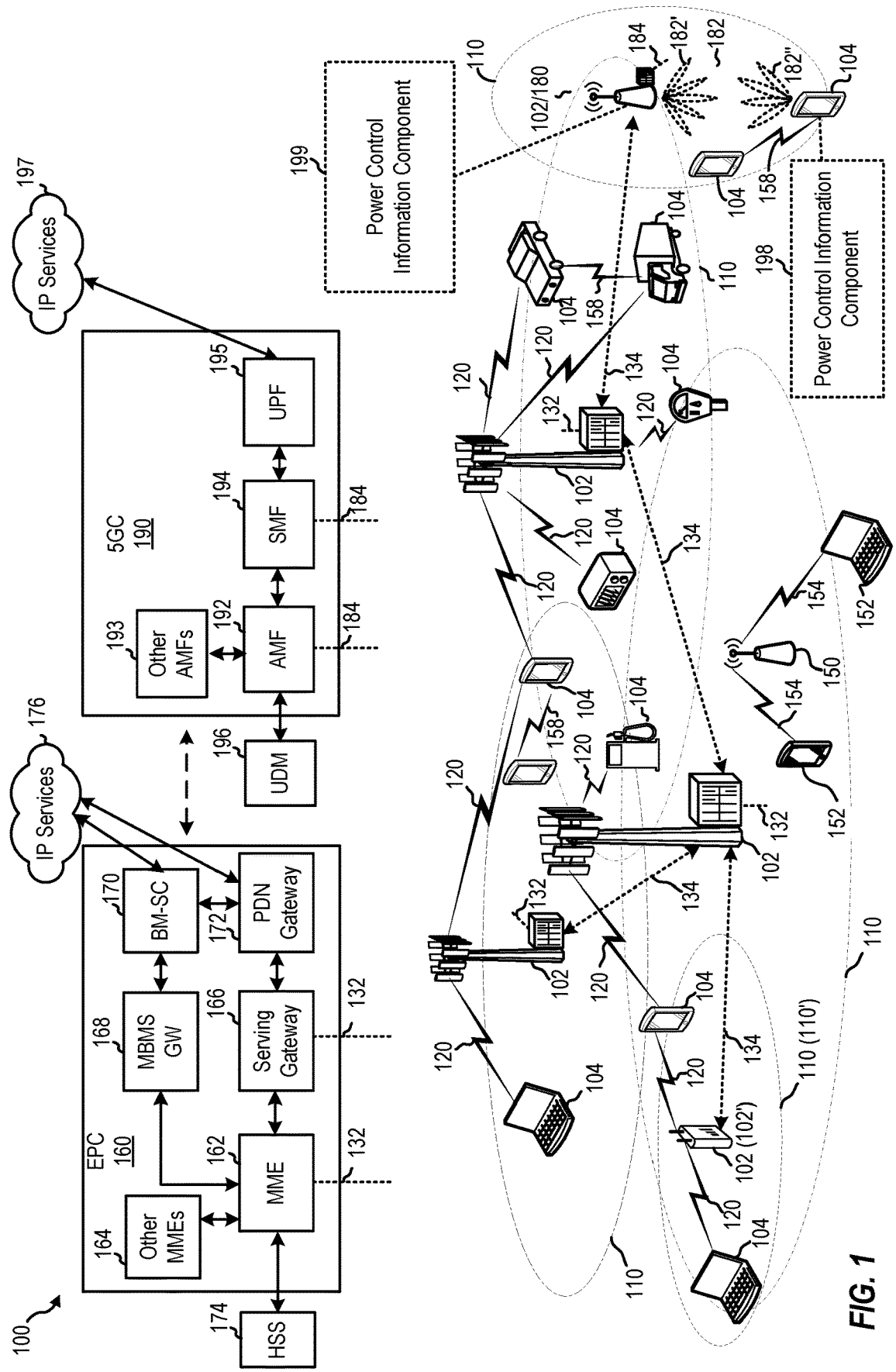
FIG. 1 is a block diagram conceptually illustrating an example wireless communication network, in accordance with certain aspects of the present disclosure.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 (e.g., a gNB) and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 4A:
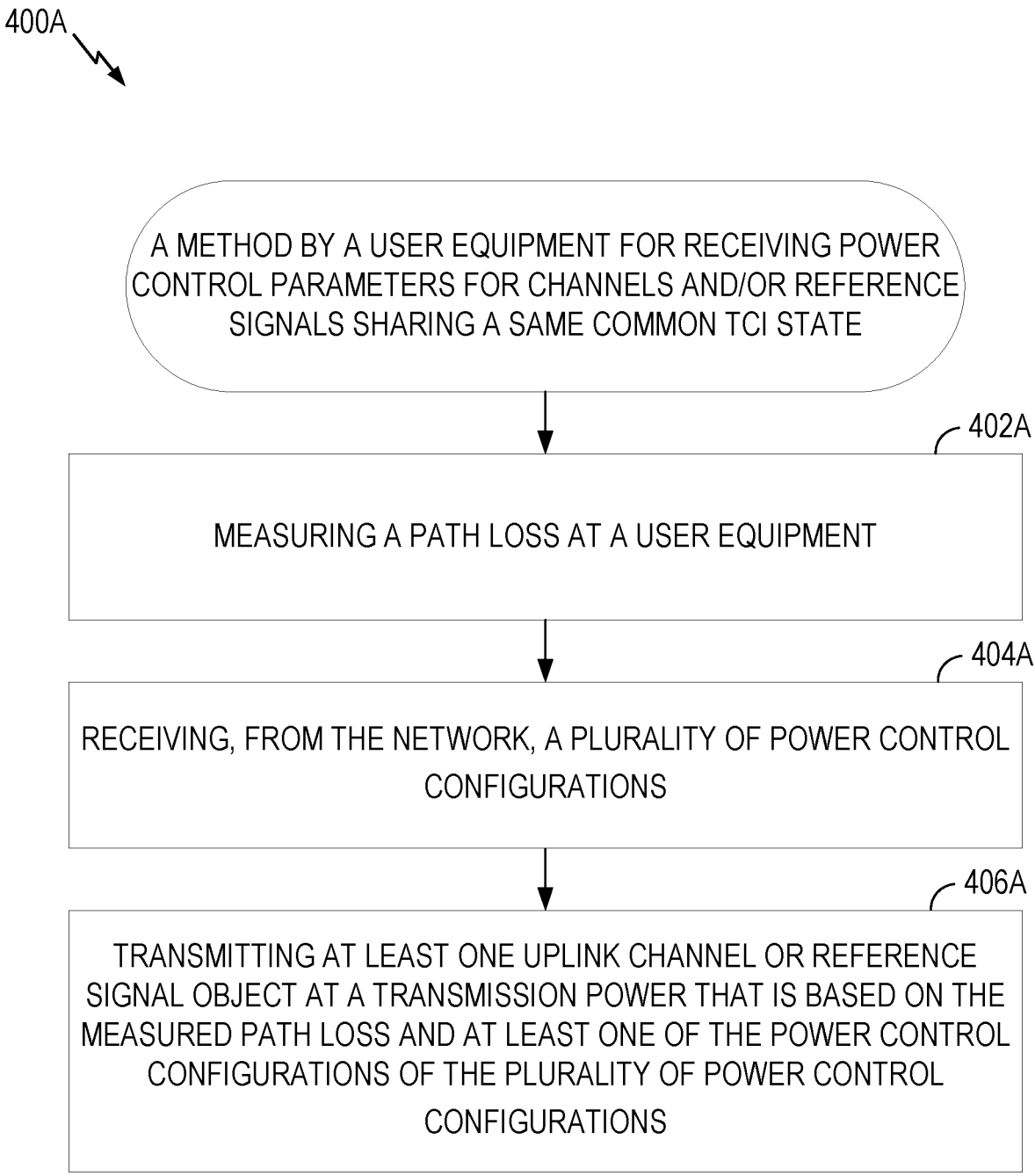
FIG. 4A is a flow diagram illustrating example operations for wireless communication by a user equipment (UE), in accordance with certain aspects of the present disclosure.
Figure 5:
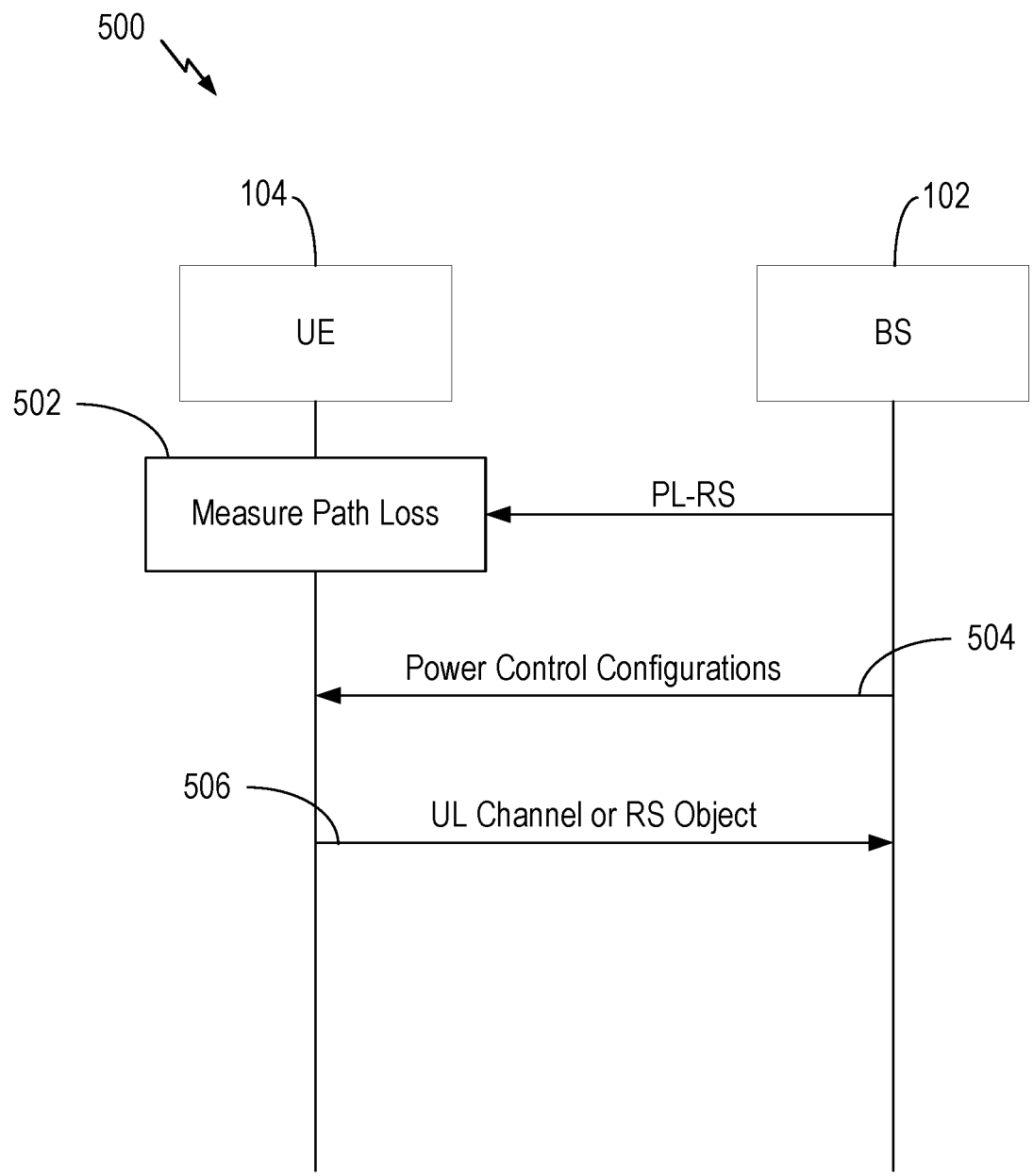
FIG. 5 is an example call flow diagram illustrating example operations for wireless communication between the UE and the BS, in accordance with certain aspects of the present disclosure.

In some cases, BS 102 in the wireless communication network 100 may include a power control information component 199, which may be configured to perform the operations depicted and described with respect to FIGS. 4B and 5, as well as other operations described herein for configuring power control parameters for channels and/or reference signals sharing a same common TCI state. Additionally, a UE 104 in the wireless communication network 100 may include a power control information component 198, which may be configured to perform the operations depicted and described with respect to FIGS. 4A and 5, as well as other operations described herein for receiving power control parameters for channels and/or reference signals sharing a same common TCI state.

Figure 2:
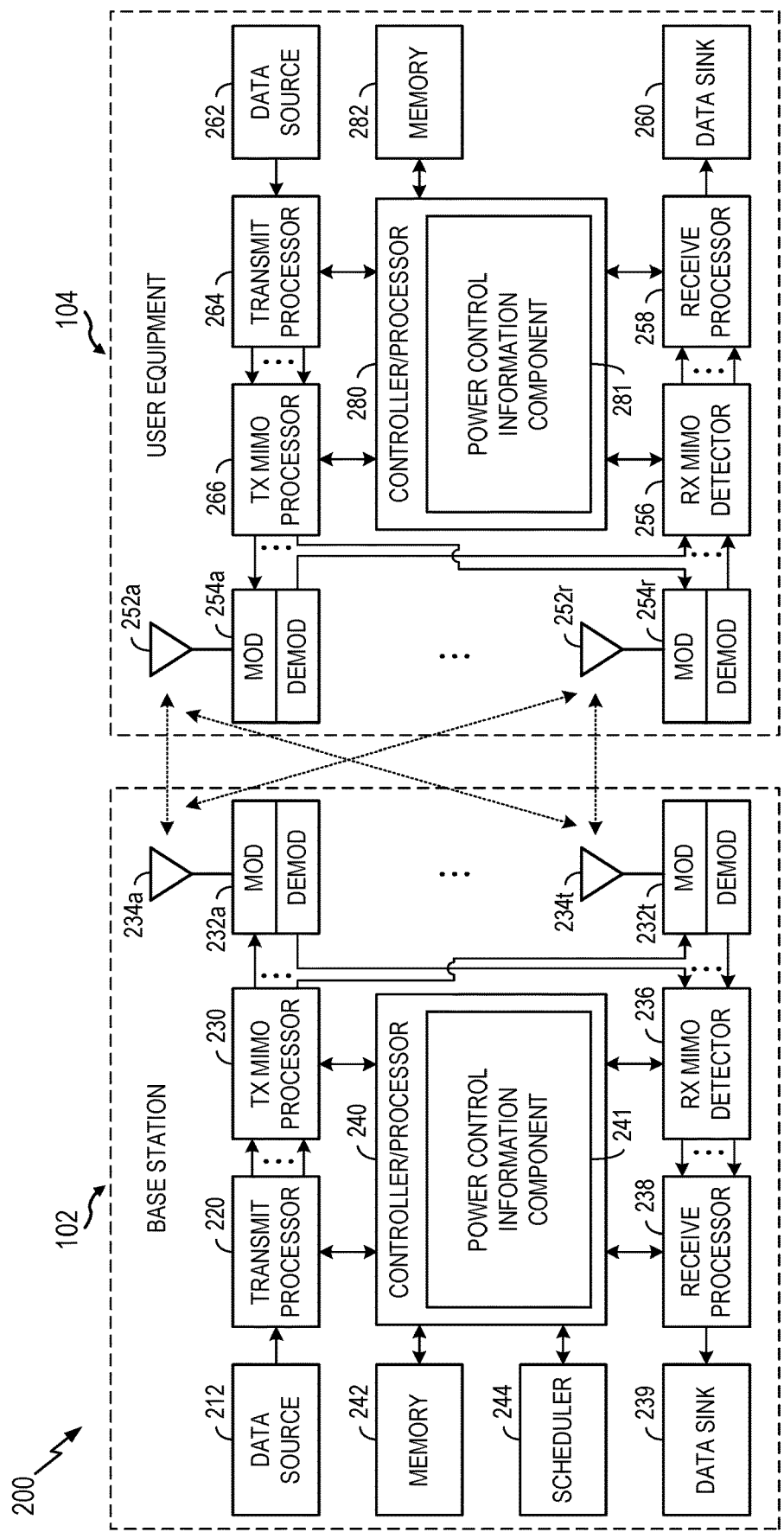
FIG. 2 is a block diagram conceptually illustrating aspects of an example a base station (BS) and user equipment (UE), in accordance with certain aspects of the present disclosure.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes power control information component 241, which may be representative of power control information component 199 of FIG. 1. Notably, while depicted as an aspect of controller/processor 240, power control information component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes power control information component 281, which may be representative of power control information component 198 of FIG. 1. Notably, while depicted as an aspect of controller/processor 280, power control information component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Example Power Control Information for Common TCI States

In certain networks, such as a fifth generation (5G) New Radio (NR) network, a user equipment (UE) may communicate with the network via one or more cells (e.g., one or more serving cells) and using one or more component carriers (or carrier bandwidths). In 5G, each component carrier may be defined by one or more bandwidth parts (BWPs). In some cases, a bandwidth part may be considered as a contiguous set of physical resource blocks, selected from a contiguous subset of the common resource blocks for a given numerology on a given carrier. In some cases, the UE may be configured with a maximum of four BWPs in the downlink (DL) and uplink (UL) for a given carrier.

Additionally, in certain cases, only one BWP for the given carrier may be active at any given time. For example, assuming that the UE is configured with four BWPs (BWP0, BWP1, BWP2, and BWP3), only one of the four BWPs may be active at a given time while the other BWPs remain inactive. However, while only one BWP may be active at a time, the active BWP may be switched to a different BWP. For example, assuming BWP1 is the active BWP, the active BWP may be switched to BWP2 or BWP3 based on certain criteria.

In some cases, the UE may be configured with a set of beam indication sets for communicating in one or more BWPs. For uplink transmission, the beam indication sets may be spatial relations. For downlink transmission, the beam indication sets may be transmission configuration indication (TCI) states. The set of beam indications may be configured for a particular channel or type of transmission. The UE may be configured with the beam indication sets by higher layer signaling, such as radio resource control (RRC) signaling. In some examples, a subset of the configured sets may be activated via a medium access control element (MAC-CE). In some examples, an indication in downlink control information (DCI) may indicate (e.g., via a 3-bit indicator) one of the beam indications for the transmission scheduled by the DCI. The indicated TCI state or spatial relation may indicate to the UE the receive beam or transmit beam to use, respectively.

Different TCI beam indication types (or TCI state types) may exist. For example, in some cases, the TCI beam indication types may include several single-channel beam indication types, such as (1) a separate DL single channel/RS TCI state to indicate a beam for a single DL channel/RS, (2) a separate UL single channel/RS TCI state to indicate a beam for a single UL channel/RS, and (3) UL spatial relation info to indicate a beam for a single UL channel/RS. Additionally, in some cases, the TCI beam indication types may include three additional multi-channel beam indication types, including (4) a joint DL/UL common TCI state to indicate a common beam for at least one DL channel/RS and at least one UL channel/RS, (5) a separate DL common TCI state to indicate a common beam for at least two DL channels/RSs, and (6) a separate UL common TCI state to indicate a common beam for at least two UL channels/RSs. Generally, these beam indication types/TCI states may be updated by downlink control information (DCI). When updated, an application time associated with the updated beam indication type/TCI state may be determined from the completion of receiving the DCI or from the completion of transmitting an acknowledgement indicating the DCI was received.

In some cases, when communicating on the uplink (UL), a UE may determine a transmission power for uplink transmissions based on one or more power control (PC) parameters. Additionally, when communicating on the UL, the UE may apply the joint DL/UL common beam TCI state (e.g., type 4 above) to at least one UL channel/RS or may apply the separate UL common beam TCI state to at least two UL channel(s)/RS(s) (e.g., type 6 above). Although multiple UL channel(s)/RS(s) may share a same beam indicated by one of the common beam TCI states, the PC parameters may be different across the applied UL channel(s)/RS(s) due to different target UL performance metrics, such as UL reference signal received power (RSRP), signal to noise ratio (SNR), signal to interference plus noise ratio (SINR), a target received power level (P0) (e.g., for PUSCH), and the like. Therefore, there exists an issue regarding how to signal the PC parameters for various UL channel(s)/RS(s) to which the same joint DL/UL common beam TCI state or separate UL common beam TCI state is applied.

Accordingly, aspects of the present disclosure provide techniques for providing power control parameters for uplink channels and/or reference signals sharing a common TCI state. For example, in some cases, such techniques may include receiving a plurality of power control configurations and transmitting at least one uplink channel or reference signal object at a transmission power that is based on at least one of the power control configurations of the plurality of power control configurations. In some cases, each power control configuration of the plurality of power control configurations may comprise a plurality of power control parameters and may apply to an uplink channel or reference signal object associated with a common TCI state.

Example Operations for Providing Power Control Parameters for Uplink Channels or Reference Signals Sharing a Common TCI State FIG. 4A is a flow diagram illustrating example operations 400A for wireless communication, in accordance with certain aspects of the present disclosure.

The operations 400A may be performed, for example, by a UE (e.g., such as the UE 104 illustrated in FIGS. 1 and 2) for receiving power control parameters for channels and/or reference signals sharing a same common TCI state. The operations 400A may be implemented as software components that are executed and run on one or more processors (e.g., controller/processor 280 of FIG. 2). Further, the transmission and reception of signals by the UE in operations 400A may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400A begin, at 402A, by measuring a path loss at a user equipment. In some cases, the UE may measure path loss based on one or more path loss reference signals (PL-RSs) received from a network.

At block 404A, the UE receives from the network a plurality of power control configurations.

In some cases, each power control configuration of the plurality of power control configurations comprises a respective plurality of power control parameters. Additionally, in some cases, each power control configuration of the plurality of power control configurations applies to a respective uplink channel or reference signal object associated with a common transmission configuration indication (TCI) state. In some cases, the UE may use the power control configurations (and respective power control parameters) to determine a transmission power for transmitting at least one uplink channel or reference signal object, such as a physical uplink shared channel (PUSCH), sounding reference signal (SRS), and the like. In some cases, the transmission power may be further determined based on the measured path loss.

At block 406A, the UE transmits at least one uplink channel or reference signal object at a transmission power that is based on the measured path loss and at least one of the power control configurations of the plurality of power control configurations.

FIG. 4B is a flow diagram illustrating example operations 400B for wireless communication, in accordance with certain aspects of the present disclosure. The operations 400B may be performed, for example, by a BS (e.g., such as the BS 102 illustrated in FIGS. 1 and 2) for providing power control parameters for channels and/or reference signals sharing a same common TCI state. The operations 400B may be complementary to the operations 400A performed by the UE as described with respect to FIG. 4A. The operations 400B may be implemented as software components that are executed and run on one or more processors (e.g., controller/processor 240 of FIG. 2). Further, the transmission and reception of signals by the BS in operations 400B may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400B begin, at 402B, by transmitting a plurality of power control configurations to the UE.

In some cases, each power control configuration of the plurality of power control configurations comprises a plurality of power control parameters. Additionally, in some cases, each power control configuration of the plurality of power control configurations applies to an uplink channel or reference signal object associated with a common transmission configuration indication (TCI) state.

At 404B, the BS receives at least one uplink channel or reference signal object with a transmission power that is based on at least one of the power control configurations of the plurality of power control configurations.

Example Call Flow Illustrating Example Operations Between a Base Station and User Equipment for Providing Power Control Parameters for Uplink Channels or Reference Signals Sharing a Common TCI State FIG. 5 is an example call flow diagram illustrating operations 500 performed by a UE (e.g., such as the UE 104 illustrated in FIGS. 1 and 2) and a BS (e.g., such as the BS 102 illustrated in FIGS. 1 and 2) for providing power control parameters for channels and/or reference signals sharing a same common TCI state.

As shown, operations 500 begin in block 502 with the UE 104 measuring a path loss based on a PL-RS received from the BS 102.

At block 504, the BS 102 transmits a plurality of power control configurations to the UE. In some cases, each power control configuration of the plurality of power control configurations comprises a plurality of power control parameters. Additionally, in some cases, each power control configuration of the plurality of power control configurations applies to an uplink channel or reference signal object associated with a common TCI state.

Thereafter, as shown at block 506, the UE 104 transmits at least one uplink channel or reference signal object to the BS 102 at a transmission power that is based on the path loss measured at 502 and at least one of the power control configurations of the plurality of power control configurations received at 504. In some cases, the uplink channel or reference signal object may include, for example, a PUSCH, an SRS, and/or the like.

Additional Details for Providing Power Control Parameters for Uplink Channels or Reference Signals Sharing a Common TCI State As noted above, aspects of the present disclosure provide techniques for providing power control parameters for channels and/or reference signals sharing a same common beam TCI state. According to aspects, the power control parameters may be included in a plurality of power control configurations where each power control configuration of the plurality of power control configurations applies to a respective UL channel/RS object associated with a common TCI state.

In some cases, each respective uplink channel or reference signal object may define at least one of a type of physical uplink channel for the respective uplink channel or reference signal object, a physical uplink resource for the respective uplink channel or reference signal object, or a physical uplink resource set for the respective uplink channel or reference signal object. In some cases, the type of physical uplink channel is one of a sounding reference signal (SRS), a physical uplink control channel (PUCCH), or a physical uplink shared channel (PUSCH). Additionally, in some cases, the physical uplink resource is one of a SRS resource or a PUCCH resource. Additionally, in some cases, the physical uplink resource set is one of a SRS resource set or a PUCCH resource set.

In some cases, the power control parameters may include, for example, P0, α (e.g., a path loss compensation factor), closed-loop power control index, and information regarding a path loss RS (e.g., for measuring path loss). Further, in some cases, the TCI state may include at least one of the joint DL/UL common beam TCI state or a separate UL common beam TCI state (e.g., TCI beam indication types 4 and 6, described above). In other words, in some cases, the common TCI state indicates a common TCI state for at least one downlink channel or reference signal object and at least one uplink channel or reference signal object. Additionally, in some cases, the common TCI state indicates a common TCI state for at least a first uplink channel or reference signal object and a second uplink channel or reference signal object.

In some cases, all or a subset of the power control parameters included within a respective power control configuration for the UL channel(s)/RS(s) to which a TCI state is applied may be signaled or otherwise provided to the UE in different manners.

For example, in some cases, the power control configurations may be signaled or provided according to a first manner. In some cases, the first manner of signaling the power control configurations (including the respective power control parameters) may include signaling/providing the power control configurations (e.g., including the respective power control parameters) per UL channel/RS object, regardless of which TCI state is applied to the UL channel/RS object. Accordingly, for example, in some cases, each respective power control configuration of the plurality of power control configurations may depend on the respective uplink channel or reference signal object associated with that respective power control configuration (e.g., to which the respective power control configuration applies), which may be irrespective of the common TCI state associated with that respective uplink channel or reference signal object. In other words, all or a subset of the power control parameters within a respective power control configuration may only depend on the UL channel/RS object and are invariant to the applied TCI state.

In other cases, the power control configurations may be signaled or provided according to a second manner. In some cases, the second manner of signaling the power control configurations (including the respective power control parameters) may include signaling or otherwise providing the power control configurations (e.g., including the respective power control parameters) per TCI state, regardless of the UL channel/RS object to which the TCI state is applied. Accordingly, for example, in some cases, each respective power control configuration of the plurality of power control configurations depends on a respective common TCI state of a plurality of common TCI states associated with that respective power control configuration, which may be irrespective of the respective uplink channel or reference signal object associated with that common TCI state. In other words, all or a subset of the power control parameters within a respective power control configuration only depend on the applied common TCI state, and are invariant to the UL channel/RS objects to which the common TCI state is applied.

Additionally, in some cases, the power control configurations may be signaled or provided according to a third manner. In some cases, the third manner of signaling the power control configurations (including the respective power control parameters) may include signaling or otherwise providing the power control configurations (e.g., including the respective power control parameters) per UL channel/RS object and per TCI state. For example, in some cases, each respective power control configuration of the plurality of power control configurations depends on the respective uplink channel or reference signal object associated with that respective power control configuration and a respective common TCI state of a plurality of common TCI states associated with that respective power control configuration. In other words, all or a subset of the power control parameters within a respective power control configuration depend on both the applied TCI state and the UL channel/RS object.

According to certain aspects, the power control configurations provided via the first manner described above (e.g., where all or a subset of the respective power control parameters of each power control configuration are provided per UL channel/RS object) may be provided via explicit signaling. For example, when using the first manner of providing the power control configurations, each respective power control configuration of the plurality of power control configurations may be configured in a same information element (IE) as the respective uplink channel or reference signal object associated with the respective power control configuration (e.g., in a same IE as the uplink channel or reference signal object to which the respective power control configuration applies).

In other cases, when using the first manner of providing the power control configurations, each respective power control configuration of the plurality of power control configurations may be configured in a different IE than the respective uplink channel or reference signal object to which the respective power control configuration applies. In such cases, a preconfigured relationship may be used to associate an IE of that respective power control configuration with an IE of the respective uplink channel or reference signal object associated with that respective power control configuration. As an example, a power control configuration ID #1 may be linked to UL channel/RS object ID #5. In some cases, the preconfigured relationship may be configured in memory of the UE (e.g., UE 104) prior to operation of the UE, for example, by a manufacturer of the UE.

In some cases, when using the first manner of providing the power control configurations, the power control configurations (including the respective power control parameters) may be dynamically signaled in downlink control information (DCI) or a MAC-CE (e.g., in separate fields). In some cases, dynamically signaling power control configurations means that these power control configurations may be transmitted/updated by the BS 102 at will (e.g., at any time) within a DCI or a MAC-CE. Accordingly, in some cases, each respective power control configuration of the plurality of power control configurations is configured in a different IE than the respective uplink channel or reference signal object to which the respective power control configuration applies. In such cases, a dynamically configured relationship associates an IE of that respective power control configuration with an IE of the respective uplink channel or reference signal object associated with that respective power control configuration.

According to certain aspects, in some cases, the power control configurations provided via the second manner described above (e.g., where all or a subset of the respective power control parameters of each power control configuration are provided per TCI state) may be provided via explicit signaling or implicit signaling. For example, in some cases, a first option for providing the power control configurations in explicit signaling via the second manner may include providing the power control configurations within a TCI state IE. For example, each respective power control configuration of the plurality of power control configurations is configured in a same IE as the respective common TCI state associated with the respective power control configuration.

In some cases, a second option for providing the power control configurations in explicit signaling via the second manner may include providing the power control configurations within a separate IE that is associated with a TCI state via a pre-configured linkage or association. For example, in some cases, each respective power control configuration of the plurality of power control configurations is configured in a different IE than the respective common TCI state associated with the respective power control configuration. In such cases, a preconfigured relationship may associate an IE of that respective power control configuration with an IE of the respective common TCI state associated with that respective power control configuration.

In some cases, a third option for providing the power control configurations in explicit signaling via the second manner may include providing the power control configurations and the respective TCI state dynamically in DCI and/or a MAC-CE (e.g., in separate fields). For example, in some cases, each respective power control configuration of the plurality of power control configurations is configured in a different IE than the respective common TCI state associated with the respective power control configuration, and for each respective power control configuration of the plurality of power control configurations, a dynamically configured relationship associates an IE of that respective power control configuration with an IE of the respective common TCI state associated with that respective power control configuration. Further, according to the third option of the second manner of providing the power control configurations, the UE may receive one or more MAC-CEs or DCI from the base station of the network configured to dynamically associate the IE of the respective power control configuration with the IE of the respective common TCI state associated with that respective power control configuration.

As noted above, the power control configurations provided via the second manner (e.g., where all or a subset of the respective power control parameters of each power control configuration are provided per TCI state) may be provided via implicit signaling. For example, in some cases, a signaled path loss RS may be identical to the UL beam indication RS in the TCI state (e.g. QCL-TypeD RS in joint DL/UL common beam TCI state or spatial RS in separate UL common beam TCI state). In some cases, this implicit PL RS may be implicitly enabled if the UL beam indication RS is a periodic DL RS and no separate PL RS is signaled or explicitly enabled by the base station of the network (e.g., via an RRC flag). Accordingly, in some cases, at least one power control configuration of the plurality of power control configurations may be configured implicitly based on an uplink beam reference signal configured for the respective common TCI state associated with the at least one power control configuration, which may be based on an RRC flag in an RRC message received by the UE.

According to certain aspects, in some cases, the power control configurations provided via the third manner described above (e.g., where all or a subset of the respective power control parameters of each power control configuration are provided per TCI state) may be provided via explicit signaling. For example, in some cases, a first option for providing the power control configurations in explicit signaling via the third manner may include providing or configuring each respective power control configuration of the plurality of power control configurations in a same IE as the respective common TCI state associated with the respective power control configuration.

In some cases, a second option for providing the power control configurations in explicit signaling via the third manner may include providing the power control configurations within a separate IE which is associated with a TCI state via a preconfigured linkage or association. For example, in some cases, each respective power control configuration of the plurality of power control configurations may be configured in a different IE than the respective common TCI state associated with the respective power control configuration. In such cases, for each respective power control configuration of the plurality of power control configurations, a preconfigured relationship associates an IE of that respective power control configuration with an IE of the respective common TCI state associated with that respective power control configuration. As an example, power control configuration ID #1 for an UL channel/RS object may be associated with TCI state ID #5, such that power control configurations are signaled per UL channel/RS object per TCI state.

In some cases, a third option for providing the power control configurations in explicit signaling via the third manner may include providing the power control configurations per UL channel/RS object and the respective TCI state dynamically in DCI and/or a MAC-CE (e.g., in separate fields). For example, in some cases, each respective power control configuration of the plurality of power control configurations may be configured in a different IE than the respective common TCI state associated with the respective power control configuration. In such cases, for each respective power control configuration of the plurality of power control configurations, a dynamically configured relationship associates an IE of that respective power control configuration with an IE of the respective common TCI state associated with that respective power control configuration. Further, according to the third option of the third manner of providing the power control configurations, the UE may receive one or more MAC-CEs or DCI from the base station of the network configured to dynamically associate the IE of the respective power control configuration with the IE of the respective common TCI state associated with that respective power control configuration.

Example Wireless Communication Devices

Figure 6:
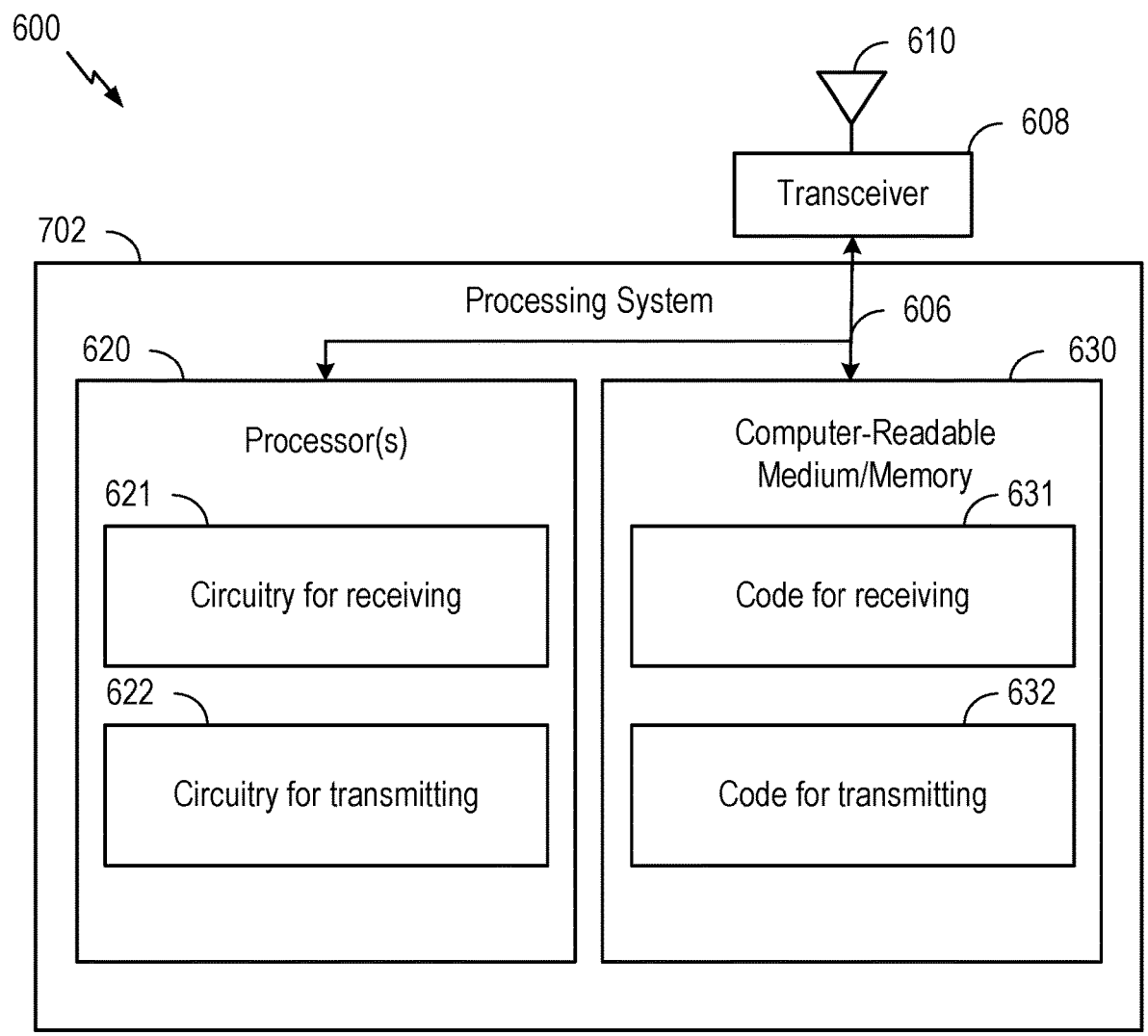
FIG. 6 illustrates an example wireless communications device configured to perform operations for the methods disclosed herein, in accordance with certain aspects of the present disclosure.

FIG. 6 depicts an example communications device 600 that includes various components operable, configured, or adapted to perform operations for the techniques disclosed herein, such as the operations depicted and described with respect to FIGS. 4B and 5. In some examples, communications device 600 may be a BS 102 as described, for example with respect to FIGS. 1 and 2.

Communications device 600 includes a processing system 602 coupled to a transceiver 608 (e.g., a transmitter and/or a receiver). Transceiver 608 is configured to transmit (or send) and receive signals for the communications device 600 via an antenna 610, such as the various signals as described herein. Processing system 602 may be configured to perform processing functions for communications device 600, including processing signals received and/or to be transmitted by communications device 600.

Processing system 602 includes one or more processors 620 coupled to a computer-readable medium/memory 630 via a bus 606. In certain aspects, computer-readable medium/memory 630 is configured to store instructions (e.g., computer-executable code) that when executed by the one or more processors 620, cause the one or more processors 620 to perform the operations illustrated in FIGS. 4B and 5, or other operations for performing the various techniques discussed herein for providing power control parameters for channels and/or reference signals sharing a same common TCI state.

In the depicted example, computer-readable medium/memory 630 stores code 631 for receiving and code 632 for transmitting.

In the depicted example, the one or more processors 620 include circuitry configured to implement the code stored in the computer-readable medium/memory 630, including circuitry 621 for receiving and circuitry 622 for transmitting.

Various components of communications device 600 may provide means for performing the methods described herein, including with respect to FIGS. 4B and 5.

In some examples, means for transmitting or sending (or means for outputting for transmission) may include the transceivers 232 and/or antenna(s) 234 of the BS 102 illustrated in FIG. 2 and/or transceiver 608 and antenna 610 of the communications device 600 in FIG. 6.

In some examples, means for receiving (or means for obtaining) may include the transceivers 232 and/or antenna(s) 234 of the base station illustrated in FIG. 2 and/or transceiver 608 and antenna 610 of the communications device 600 in FIG. 6.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

Notably, FIG. 6 is an example, and many other examples and configurations of communications device 600 are possible.

Figure 7:
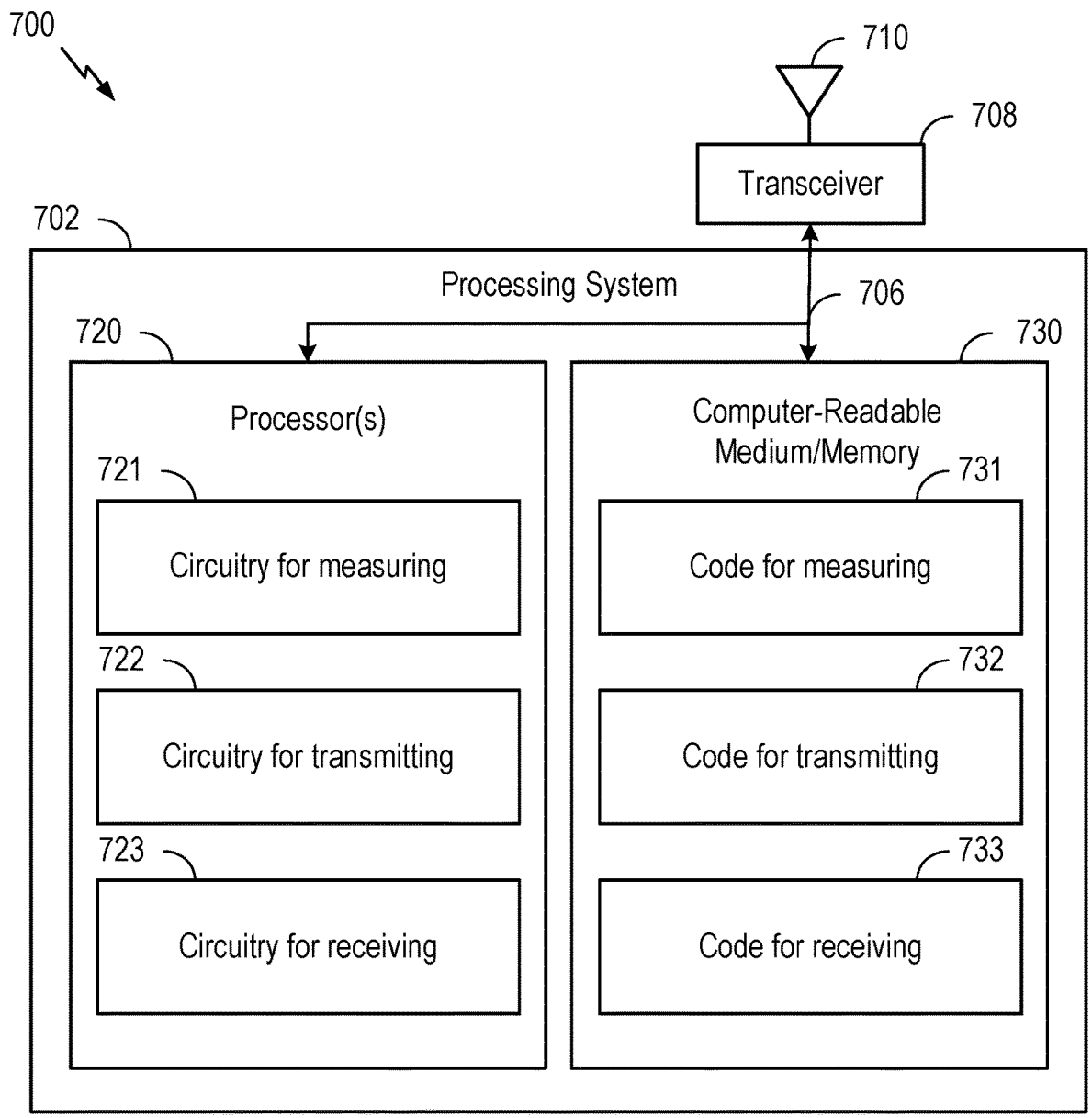
FIG. 7 illustrates an example wireless communications device configured to perform operations for the methods disclosed herein, in accordance with certain aspects of the present disclosure.

FIG. 7 depicts an example communications device 700 that includes various components operable, configured, or adapted to perform operations for the techniques disclosed herein, such as the operations depicted and described with respect to FIGS. 4A and 5. In some examples, communications device 700 may be a UE 104 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIGS. 4A and 5, or other operations for performing the various techniques discussed herein for providing power control parameters for channels and/or reference signals sharing a same common TCI state.

In the depicted example, computer-readable medium/memory 730 stores code 731 for measuring, code 732 for transmitting, code 733 for receiving.

In the depicted example, the one or more processors 720 include circuitry configured to implement the code stored in the computer-readable medium/memory 730, including circuitry 721 for measuring, circuitry 722 for transmitting, and circuitry 723 for receiving.

Various components of communications device 700 may provide means for performing the methods described herein, including with respect to FIGS. 4A and 5.

In some examples, means for transmitting or sending (or means for outputting for transmission) may include the transceivers 254 and/or antenna(s) 252 of the UE 104 illustrated in FIG. 2 and/or transceiver 708 and antenna 710 of the communications device 700 in FIG. 7.

In some examples, means for receiving (or means for obtaining) may include the transceivers 254 and/or antenna(s) 252 of the UE 104 illustrated in FIG. 2 and/or transceiver 708 and antenna 710 of the communications device 700 in FIG. 7.

In some examples, means for measuring may include various processing system components, such as: the one or more processors 720 in FIG. 7, or aspects of the UE 104 depicted in FIG. 2, including receive processor 258, transmit processor 264, TX MIMO processor 266, and/or controller/processor 280 (including power control information component 281).

Notably, FIG. 7 is an example, and many other examples and configurations of communications device 700 are possible.

Example Clauses

Implementation examples are described in the following numbered clauses:

Clause 1: A method for wireless communications, comprising: measuring a path loss at a user equipment; receiving, from a network, a plurality of power control configurations based on the path loss measurement sent to the network, wherein: each power control configuration of the plurality of power control configurations comprises a respective plurality of power control parameters, and each power control configuration of the plurality of power control configurations applies to a respective uplink channel or reference signal object associated with a common transmission configuration indication (TCI) state; and transmitting at least one uplink channel or reference signal object at a transmission power that is based on the measured path loss and at least one of the power control configurations of the plurality of power control configurations.

Clause 2: The method of Clause 1, wherein each respective power control configuration of the plurality of power control configurations depend on the respective uplink channel or reference signal object associated with that respective power control configuration.

Clause 3: The method of Clause 2, wherein each respective power control configuration of the plurality of power control configurations is configured in a same information element (IE) as the respective uplink channel or reference signal object to which the respective power control configuration applies.

Clause 4: The method of Clause 2, wherein: each respective power control configuration of the plurality of power control configurations is configured in a different information element (IE) than the respective uplink channel or reference signal object to which the respective power control configuration applies, and for each respective power control configuration of the plurality of power control configurations, a preconfigured relationship associates an IE of that respective power control configuration with an IE of the respective uplink channel or reference signal object associated with that respective power control configuration.

Clause 5: The method of Clause 2, wherein: each respective power control configuration of the plurality of power control configurations is configured in a different information element (IE) than the respective uplink channel or reference signal object to which the respective power control configuration applies, and for each respective power control configuration of the plurality of power control configurations, a dynamically configured relationship associates an IE of that respective power control configuration with an IE of the respective uplink channel or reference signal object associated with that respective power control configuration.

Clause 6: The method of Clause 5, further comprising receiving one or more a medium access control control elements (MAC-CEs) or downlink control information (DCI) from the network configured to dynamically link the IE associated with each respective power control configuration of the plurality of power control configurations with the IE associated with the respective uplink channel or reference signal object to which the respective power control configuration applies.

Clause 7: The method of Clause 1, wherein each respective power control configuration of the plurality of power control configurations depends on a respective common TCI state of a plurality of common TCI states associated with that respective power control configuration.

Clause 8: The method of Clause 7, wherein each respective power control configuration of the plurality of power control configurations is configured in a same information element (IE) as the respective common TCI state associated with the respective power control configuration.

Clause 9: The method of Clause 7, wherein: each respective power control configuration of the plurality of power control configurations is configured in a different information element (IE) than the respective common TCI state associated with the respective power control configuration, and for each respective power control configuration of the plurality of power control configurations, a preconfigured relationship associates an IE of that respective power control configuration with an IE of the respective common TCI state associated with that respective power control configuration.

Clause 10: The method of Clause 7, wherein: each respective power control configuration of the plurality of power control configurations is configured in a different information element (IE) than the respective common TCI state associated with the respective power control configuration, and for each respective power control configuration of the plurality of power control configurations, a dynamically configured relationship associates an IE of that respective power control configuration with an IE of the respective common TCI state associated with that respective power control configuration.

Clause 11: The method of Clause 10, further comprising receiving one or more a medium access control control elements (MAC-CEs) or downlink control information (DCI) from the network configured to dynamically associate the IE of each respective power control configuration of the plurality of power control configurations with the IE of the respective common TCI state associated with that respective power control configuration.

Clause 12: The method of Clause 7, wherein at least one power control configuration of the plurality of power control configurations is configured implicitly based on an uplink beam reference signal configured for the respective common TCI state associated with the at least one power control configuration.

Clause 13: The method of Clause 12, wherein the at least one power control configuration of the plurality of power control configurations is configured implicitly further based on a radio resource control (RRC) flag in an RRC message received by the user equipment.

Clause 14: The method of Clause 1, wherein each respective power control configuration of the plurality of power control configurations depends on: the respective uplink channel or reference signal object associated with that respective power control configuration and a respective common TCI state of a plurality of common TCI states associated with that respective power control configuration.

Clause 15: The method of Clause 14, wherein each respective power control configuration of the plurality of power control configurations is configured in a same information element (IE) as the respective common TCI state associated with the respective power control configuration.

Clause 16: The method of Clause 14, wherein: each respective power control configuration of the plurality of power control configurations is configured in a different information element (IE) than the respective common TCI state associated with the respective power control configuration, and for each respective power control configuration of the plurality of power control configurations, a preconfigured relationship associates an IE of that respective power control configuration with an IE of the respective common TCI state associated with that respective power control configuration.

Clause 17: The method of Clause 14, wherein: each respective power control configuration of the plurality of power control configurations is configured in a different information element (IE) than the respective common TCI state associated with the respective power control configuration, and for each respective power control configuration of the plurality of power control configurations, a dynamically configured relationship associates an IE of that respective power control configuration with an IE of the respective common TCI state associated with that respective power control configuration.

Clause 18: The method of Clause 17, further comprising receiving one or more a medium access control control elements (MAC-CEs) or downlink control information (DCI) from the network configured to dynamically associate the IE of each respective power control configuration of the plurality of power control configurations with the IE of the respective common TCI state associated with that respective power control configuration.

Clause 19: The method of any one of Clauses 1-18, wherein: each respective uplink channel or reference signal object defines a type of physical uplink channel for the respective uplink channel or reference signal object, and the type of physical uplink channel is one of a sounding reference signal (SRS), a physical uplink control channel (PUCCH), or a physical uplink shared channel (PUSCH).

Clause 20: The method of any one of Clauses 1-18, wherein: each respective uplink channel or reference signal object defines a physical uplink resource for the respective uplink channel or reference signal object, and the physical uplink resource is one of a sounding reference signal (SRS) resource or a physical uplink control channel (PUCCH) resource.

Clause 21: The method of any one of Clauses 1-18, wherein: each respective uplink channel or reference signal object defines a physical uplink resource set for the respective uplink channel or reference signal object, and the physical uplink resource set is one of a sounding reference signal (SRS) resource set or a physical uplink control channel (PUCCH) resource set.

Clause 22: The method of any one of Clauses 1-21, wherein the common TCI state indicates a common TCI state for at least one downlink channel or reference signal object and at least one uplink channel or reference signal object.

Clause 23: The method of any one of Clauses 1-21, wherein the common TCI state indicates a common TCI state for at least a first uplink channel or reference signal object and a second uplink channel or reference signal object.

Clause 24: A method for wireless communications, comprising: transmitting, to a user equipment (UE), a plurality of power control configurations based on the received path loss measurement, wherein: each power control configuration of the plurality of power control configurations comprises a respective plurality of power control parameters, and each power control configuration of the plurality of power control configurations applies to a respective uplink channel or reference signal object associated with a common transmission configuration indication (TCI) state; and receiving at least one uplink channel or reference signal object with a transmission power that is based on at least one of the power control configurations of the plurality of power control configurations.

Clause 25: The method of Clause 24, wherein each respective power control configuration of the plurality of power control configurations depend on the respective uplink channel or reference signal object associated with that respective power control configuration.

Clause 26: The method of Clause 25, wherein each respective power control configuration of the plurality of power control configurations is configured in a same information element (IE) as the respective uplink channel or reference signal object to which the respective power control configuration applies.

Clause 27: The method of Clause 25, wherein: each respective power control configuration of the plurality of power control configurations is configured in a different information element (IE) than the respective uplink channel or reference signal object to which the respective power control configuration applies, and for each respective power control configuration of the plurality of power control configurations, a preconfigured relationship associates an IE of that respective power control configuration with an IE of the respective uplink channel or reference signal object associated with that respective power control configuration.

Clause 28: The method of Clause 25, wherein: each respective power control configuration of the plurality of power control configurations is configured in a different information element (IE) than the respective uplink channel or reference signal object to which the respective power control configuration applies, and for each respective power control configuration of the plurality of power control configurations, a dynamically configured relationship associates an IE of that respective power control configuration with an IE of the respective uplink channel or reference signal object associated with that respective power control configuration.

Clause 29: The method of Clause 28, further comprising transmitting one or more a medium access control control elements (MAC-CEs) or downlink control information (DCI) to the UE configured to dynamically link the IE associated with each respective power control configuration of the plurality of power control configurations with the IE associated with the respective uplink channel or reference signal object to which the respective power control configuration applies.

Clause 30: The method of Clause 24, wherein each respective power control configuration of the plurality of power control configurations depends on a respective common TCI state of a plurality of common TCI states associated with that respective power control configuration.

Clause 31: The method of Clause 30, wherein each respective power control configuration of the plurality of power control configurations is configured in a same information element (IE) as the respective common TCI state associated with the respective power control configuration.

Clause 32: The method of Clause 30, wherein: each respective power control configuration of the plurality of power control configurations is configured in a different information element (IE) than the respective common TCI state associated with the respective power control configuration, and for each respective power control configuration of the plurality of power control configurations, a preconfigured relationship associates an IE of that respective power control configuration with an IE of the respective common TCI state associated with that respective power control configuration.

Clause 33: The method of Clause 30, wherein: each respective power control configuration of the plurality of power control configurations is configured in a different information element (IE) than the respective common TCI state associated with the respective power control configuration, and for each respective power control configuration of the plurality of power control configurations, a dynamically configured relationship associates an IE of that respective power control configuration with an IE of the respective common TCI state associated with that respective power control configuration.

Clause 34: The method of Clause 33, further comprising receiving one or more a medium access control control elements (MAC-CEs) or downlink control information (DCI) from the network configured to dynamically associate the IE of each respective power control configuration of the plurality of power control configurations with the IE of the respective common TCI state associated with that respective power control configuration.

Clause 35: The method of Clause 30, wherein at least one power control configuration of the plurality of power control configurations is configured implicitly based on an uplink beam reference signal configured for the respective common TCI state associated with the at least one power control configuration.

Clause 36: The method of Clause 35, wherein the at least one power control configuration of the plurality of power control configurations is configured implicitly further based on a radio resource control (RRC) flag in an RRC message received by the user equipment.

Clause 37: The method of Clause 24, wherein each respective power control configuration of the plurality of power control configurations depends on: the respective uplink channel or reference signal object associated with that respective power control configuration and a respective common TCI state of a plurality of common TCI states associated with that respective power control configuration.

Clause 38: The method of Clause 37, wherein each respective power control configuration of the plurality of power control configurations is configured in a same information element (IE) as the respective common TCI state associated with the respective power control configuration.

Clause 39: The method of Clause 37, wherein: each respective power control configuration of the plurality of power control configurations is configured in a different information element (IE) than the respective common TCI state associated with the respective power control configuration, and for each respective power control configuration of the plurality of power control configurations, a preconfigured relationship associates an IE of that respective power control configuration with an IE of the respective common TCI state associated with that respective power control configuration.

Clause 40: The method of Clause 37, wherein: each respective power control configuration of the plurality of power control configurations is configured in a different information element (IE) than the respective common TCI state associated with the respective power control configuration, and for each respective power control configuration of the plurality of power control configurations, a dynamically configured relationship associates an IE of that respective power control configuration with an IE of the respective common TCI state associated with that respective power control configuration.

Clause 41: The method of Clause 37, further comprising transmitting one or more a medium access control control elements (MAC-CEs) or downlink control information (DCI) to the UE configured to dynamically associate the information element (IE) of each respective power control configuration of the plurality of power control configurations with the IE of the respective common TCI state associated with that respective power control configuration.

Clause 42: The method of any one of Clauses 24-41, wherein: each respective uplink channel or reference signal object defines a type of physical uplink channel for the respective uplink channel or reference signal object, and the type of physical uplink channel is one of a sounding reference signal (SRS), a physical uplink control channel (PUCCH), or a physical uplink shared channel (PUSCH).

Clause 43: The method of any one of Clauses 24-41, wherein: each respective uplink channel or reference signal object defines a physical uplink resource for the respective uplink channel or reference signal object, and the physical uplink resource is one of a sounding reference signal (SRS) resource or a physical uplink control channel (PUCCH) resource.

Clause 44: The method of any one of Clauses 24-41, wherein: each respective uplink channel or reference signal object defines a physical uplink resource set for the respective uplink channel or reference signal object, and the physical uplink resource set is one of a sounding reference signal (SRS) resource set or a physical uplink control channel (PUCCH) resource set.

Clause 45: The method of any one of Clauses 24-44, wherein the common TCI state indicates a common TCI state for at least one downlink channel or reference signal object and at least one uplink channel or reference signal object.

Clause 46. The method of any one of Clauses 24-44, wherein the common TCI state indicates a common TCI state for at least a first uplink channel or reference signal object and a second uplink channel or reference signal object.

Clause 47: An apparatus, comprising: a memory comprising computer-executable instructions; one or more processors configured to execute the computer-executable instructions and cause the one or more processors to perform a method in accordance with any one of Clauses 1-46.

Clause 48: An apparatus, comprising means for performing a method in accordance with any one of Clauses 1-46.

Clause 49: A non-transitory computer-readable medium comprising computer-executable instructions that, when executed by one or more processors, cause the one or more processors to perform a method in accordance with any one of Clauses 1-46.

Clause 50: A computer program product embodied on a computer-readable storage medium comprising code for performing a method in accordance with any one of Clauses 1-46.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 may operate in a traditional sub-6 GHz spectrum, in millimeter wave (mmWave) frequencies, and/or near mmWave frequencies in communication with the UE 104. When the BS 180 (e.g., a gNB) operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of power control parameters for uplink channels and/or reference signals sharing a same common TCI state in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE), comprising:
one or more memories comprising executable instructions; and
one or more processors configured to execute the executable instructions and cause the UE to:
receive, from a network, a plurality of power control configurations, wherein:
each power control configuration of the plurality of power control configurations comprises a respective plurality of power control parameters;
each power control configuration of the plurality of power control configurations applies to a respective uplink channel or reference signal object associated with a common transmission configuration indication (TCI) state; and
each respective power control configuration of the plurality of power control configurations depends on a respective common TCI state of a plurality of common TCI states associated with that respective power control configuration; and
at least one power control configuration of the plurality of power control configurations is configured implicitly based on:
a periodic uplink beam reference signal configured for the respective common TCI state associated with the at least one power control configuration; and
a radio resource control (RRC) flag in an RRC message received by the UE indicating a separate pathloss reference signal not being signaled by the network; and
transmit at least one uplink channel or reference signal object at a transmission power that is based on a measured path loss and at least one of the power control configurations of the plurality of power control configurations.

2. The UE of claim 1, wherein each respective power control configuration of the plurality of power control configurations is configured in a same information element (IE) as the respective common TCI state associated with the respective power control configuration.

3. The UE of claim 1, wherein:
each respective power control configuration of the plurality of power control configurations is configured in a different information element (IE) than the respective common TCI state associated with the respective power control configuration, and
for each respective power control configuration of the plurality of power control configurations, a preconfigured relationship associates an IE of that respective power control configuration with an IE of the respective common TCI state associated with that respective power control configuration.

4. The UE of claim 1, wherein:
each respective power control configuration of the plurality of power control configurations is configured in a different information element (IE) than the respective common TCI state associated with the respective power control configuration, and
for each respective power control configuration of the plurality of power control configurations, a dynamically configured relationship associates an IE of that respective power control configuration with an IE of the respective common TCI state associated with that respective power control configuration.

5. The UE of claim 4, wherein the one or more processors are further configured to cause the UE to receive one or more a medium access control control elements (MAC-CEs) or downlink control information (DCI) from the network configured to dynamically associate the IE of each respective power control configuration of the plurality of power control configurations with the IE of the respective common TCI state associated with that respective power control configuration.

6. The UE of claim 1, wherein:
each respective uplink channel or reference signal object defines a type of physical uplink channel for the respective uplink channel or reference signal object, and
the type of physical uplink channel is one of a sounding reference signal (SRS), a physical uplink control channel (PUCCH), or a physical uplink shared channel (PUSCH).

7. The UE of claim 1, wherein:
each respective uplink channel or reference signal object defines a physical uplink resource for the respective uplink channel or reference signal object, and
the physical uplink resource is one of a sounding reference signal (SRS) resource or a physical uplink control channel (PUCCH) resource.

8. The UE of claim 1, wherein:
each respective uplink channel or reference signal object defines a physical uplink resource set for the respective uplink channel or reference signal object, and
the physical uplink resource set is one of a sounding reference signal (SRS) resource set or a physical uplink control channel (PUCCH) resource set.

9. The UE of claim 1, wherein the common TCI state indicates a common TCI state for at least one downlink channel or reference signal object and at least one uplink channel or reference signal object.

10. The UE of claim 1, wherein the common TCI state indicates a common TCI state for at least a first uplink channel or reference signal object and a second uplink channel or reference signal object.

11. A method for wireless communication by a user equipment (UE), comprising:
receiving, from a network, a plurality of power control configurations, wherein:
each power control configuration of the plurality of power control configurations comprises a respective plurality of power control parameters;
each power control configuration of the plurality of power control configurations applies to a respective uplink channel or reference signal object associated with a common transmission configuration indication (TCI) state; and
each respective power control configuration of the plurality of power control configurations depends on a respective common TCI state of a plurality of common TCI states associated with that respective power control configuration; and
at least one power control configuration of the plurality of power control configurations is configured implicitly based on:
a periodic uplink beam reference signal configured for the respective common TCI state associated with the at least one power control configuration; and
a radio resource control (RRC) flag in an RRC message received by the UE indicating a separate pathloss reference signal not being signaled by the network; and
transmitting at least one uplink channel or reference signal object at a transmission power that is based on a measured path loss and at least one of the power control configurations of the plurality of power control configurations.

12. The method of claim 11, wherein each respective power control configuration of the plurality of power control configurations is configured in a same information element (IE) as the respective common TCI state associated with the respective power control configuration.

* * * * *